(12) United States Patent
Frenger

(10) Patent No.: US 7,885,295 B2
(45) Date of Patent: Feb. 8, 2011

(54) COMMUNICATION RESOURCE MANAGEMENT

(75) Inventor: Pal Frenger, Linköping (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 610 days.

(21) Appl. No.: 11/917,510

(22) PCT Filed: Jun. 17, 2005

(86) PCT No.: PCT/SE2005/000939

§ 371 (c)(1),
(2), (4) Date: Dec. 14, 2007

(87) PCT Pub. No.: WO2006/135289

PCT Pub. Date: Dec. 21, 2006

(65) Prior Publication Data

US 2009/0252093 A1 Oct. 8, 2009

(51) Int. Cl.
*H04J 4/00* (2006.01)
(52) U.S. Cl. .................. 370/478; 370/210; 370/208; 455/450
(58) Field of Classification Search .................. None
See application file for complete search history.

(56) References Cited

U.S. PATENT DOCUMENTS 6,157,656 A * 12/2000 Lindgren et al. ............ 370/458
7,616,746 B2 * 11/2009 O'Neill .................. 379/114.01

OTHER PUBLICATIONS

Peled and Ruiz, Frequency Domain Data Transmission Using Reduced Computational Complexity Algorithms, Proc. IEEE ICASSP, pp. 964-957, Denver, Colorado, 1980.
Henkel, et al., The Cyclic Prefix of OFDM/DMT—An Analysis, Proc. Int. Zurich Seminar on Broadband Communications, pp. 22-1 through 22-2, Zurich, Switzerland, 2002.

* cited by examiner

*Primary Examiner*—Bob A Phunkulh

(57) ABSTRACT

The invention involves management of communication resources (40, 45) in a network (1) utilizing multi-node-adapted resources (40) for transmission of multi-node-associated information and single-node-adapted resources (45) for transmission of single-node-associated information. A default resource allocation (60) specifying, for all transmitter nodes (10, 15) in the network (1), when the respective resource type is available for usage is defined. A subset (10) of the nodes in the network (1) estimates an expected amount of multi and/or single-node-associated information to be transmitted by the node subset (10). The default resource allocation (60) is then dynamically adjusted, for the node subset (10), based on the estimated expected information amount, implying that the physical resources (40, 45) defined by the default time structure (60) are dynamically shared in the frequency domain. According to the adjusted default resource allocation (65), a multi/single-node-adapted resource (40) will be allocated for transmission, by the node subset (10), of single/multi-node-associated information.

22 Claims, 6 Drawing Sheets

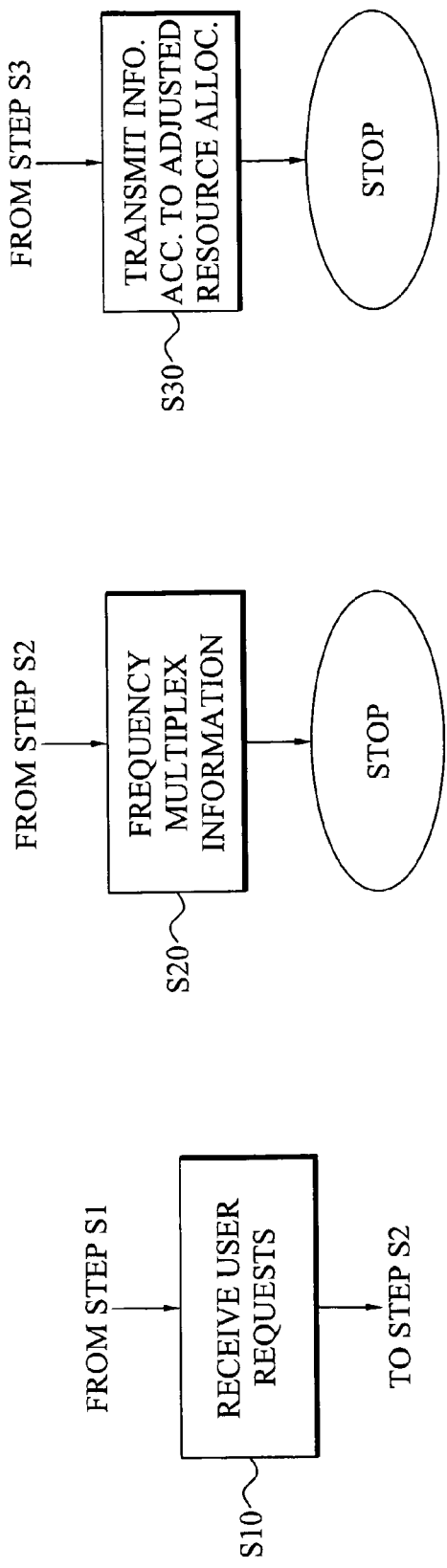
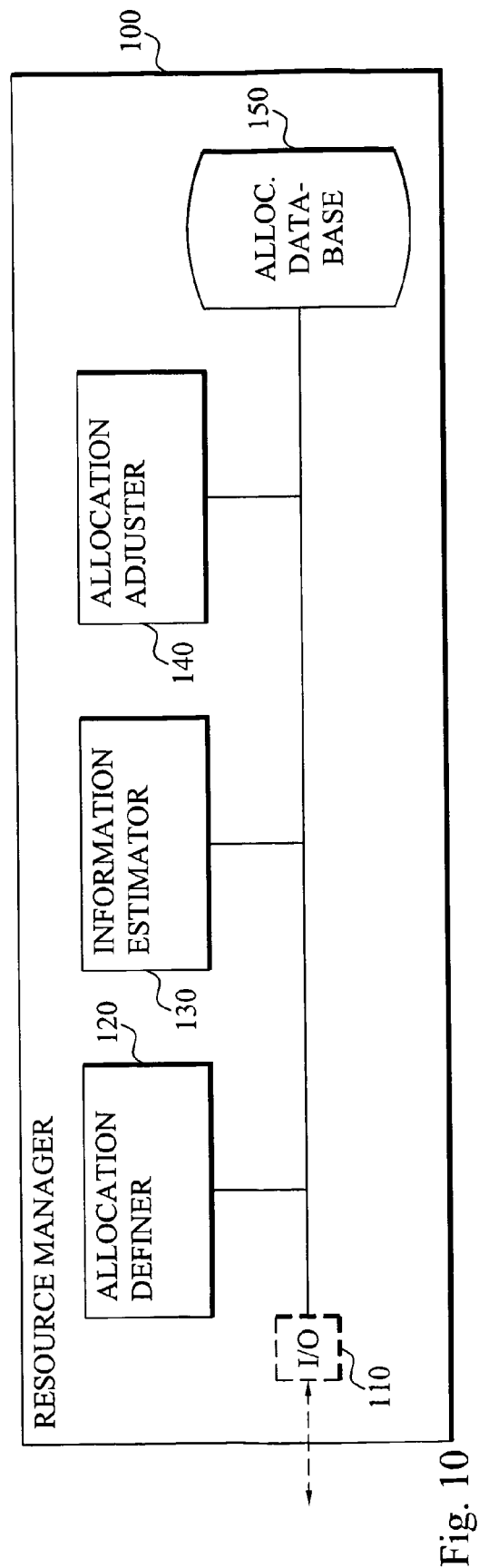

COMMUNICATION RESOURCE MANAGEMENT

TECHNICAL FIELD

The present invention generally relates to communication resource management in wireless communication systems, and in particular to adjusting schemes specifying resource utilization in such systems.

BACKGROUND

Orthogonal frequency division multiplexing (OFDM) is considered a prime candidate for the fourth generation (4G) and the super third generation (S3G) radio access systems. This choice is partly based on the effective utilization of the available bandwidth compared to other multiplexing techniques. In OFDM, the available bandwidth is subdivided into many narrow bandwidth sub-carriers. These sub-carriers are orthogonal to each other, thus allowing them to be packed together much closer than standard frequency division multiplexing (FDM) and providing a higher spectral efficiency. Each user may be allocated several sub-carriers in which to transmit their data, allowing multiple data symbols to be sent in parallel. In other words, a transmitted OFDM signal multiplexes several low-rate data streams, where each data stream is associated with a given sub-carrier. A main advantage with this concept is that each of the data streams experiences an almost flat fading channel.

When an OFDM signal is transmitted over a dispersive channel, the channel dispersion destroys the orthogonality between sub-carriers and causes intercarrier interference (ICI). In addition, a system may transmit multiple OFDM symbols in series so that a dispersive channel causes inter-symbol interference (ISI) between successive OFDM symbols. The orthogonality of the sub-carriers can be preserved and ICI and ISI can be prevented by employing so-called cyclic extensions inserted between consecutive OFDM symbols [1, 2].

As long as the duration of the channel impulse response is less than the length of the cyclic extension, channel equalization can be performed with just a single complex multiplication per sub-carrier and ISI and ICI are prevented. If the channel impulse-response exceeds the cyclic extension length, both ISI and ICI will occur.

Today OFDM is used in digital terrestrial broadcast systems such as Digital Video Broadcasting (DVB) and Digital Audio Broadcasting (DAB). One reason for selecting OFDM for digital broadcast is the possibility to operate the system in a Single Frequency Network (SFN) mode. In SFN mode, the same radio signal is transmitted from all radio transmitter nodes in the network. As long as the transmitted radio signals in the network are received by a receiver terminal within a time window less than the length of the cyclic extension, the resulting signal can be detected without ISI or ICI using a very simple channel equalizer. The signals from the different transmitters are combined at the receiver terminal in the same way as different multi-path signals are combined.

The cyclic extension is typically discarded in the receiver terminal and, hence, it is associated with an overhead cost that should be kept as small as possible. Typically the length of the channel impulse response and, thus, of the cyclic extension depends on the maximum expected distance between the transmitter node(s) and the receiver terminal. The longer the distance the longer cyclic extension is in general needed.

When employing the SFN technique for information that shall be broadcast to multiple receiver terminals, the required cyclic extension must typically be longer than what is needed for normal cellular operation where node-specific information is transmitted between a single transmitter node and a receiver terminal in a given cell.

In order to enable efficient support of broadcast information, OFDM symbols with long associated cyclic extensions for broadcast in SFN operation mode are time multiplexed with symbols having shorter cyclic extensions for normal node-specific operation (unicasting). The so-obtained semi-fixed time pattern or allocation structure of multiplexed symbols of long and short cyclic extensions, respectively, are then employed by all transmitter nodes throughout the network.

SUMMARY

A drawback with the prior art is that the mix of symbols with long and short cyclic extensions is very difficult to change since it involves the whole network, i.e. all transmitter nodes in the network. However, the actual need for broadcast traffic and normal node-specific (unicast) traffic in different parts of the network may differ from what is stipulated or defined by the semi-fixed symbol mix. This results in an inefficient utilization of communication resources and low system throughput.

The present invention overcomes these and other drawbacks of the prior art arrangements.

It is a general object of the present invention to provide an efficient and flexible management of communication resources in a wireless communication system employing at least two different types of resources for transmission of information.

It is another object of the invention to provide a dynamic and local adjustment of a pre-defined resource scheduling scheme in a wireless communication system.

These and other objects are met by the invention as defined by the accompanying patent claims.

Briefly, the present invention involves managing communication resources in a wireless communication system having at least two types of resources adapted for usage when transmitting different information or data types.

According to the invention a default resource allocation structure is defined for all transmitter nodes in the communication system. This default resource allocation specifies a single time division multiplexing of the different resource types describing the time pattern of resource allocation for the transmitter nodes. In other words, the default resource allocation specifies when to use the different resource types for the transmitter nodes to transmit information to user terminals.

According to the present invention, a first resource type is a so-called multi-node-adapted communication resource that is adapted for time-coordinated transmission of information from multiple transmitter nodes to one or more user terminals. A typical example of such time-coordinated transmission is SFN broadcasting for transmitter nodes operating in the SFN mode. The time-coordination means that there is a time-relation between the transmission occasions for the participating nodes preferably so that the transmitted signals carrying the same information is reached the destined user terminal(s) within such a short time-window as possible. The transmitter nodes could be time-synchronized to transmit the same information synchronously. The resources adapted for this time-coordinated multi-node transmission are preferably orthogonal sub-carriers with OFDM symbols having long associated cyclic extension (to combat ICI and ISI). The second resource type is correspondingly a so-called single-node-adapted communication resource adapted for (unicasting or multicasting) transmission of information from a single node to one or more user terminals. A preferred example of such a single-node-adapted resource is an orthogonal sub-carrier with OFDM symbols having short associated cyclic extensions. The multi-node-adapted resources are then adapted for carrying multi-node-associated information, e.g. SFN broadcast information, whereas single-node-adapted resources are adapted for carrying single-node-associated information.

The default resource allocation typically specifies a mix, in the time domain, of the multi-node-adapted resources and the single-node-adapted resources, thereby specifying when the transmitter nodes can transmit multi-node-associated information and single-node-associated information, respectively.

A subset of the transmitter nodes in the network then estimates an expected amount of multi-node-associated and/or single-node-associated information to be transmitted by the node subset. The expected amount of information could be based on an estimation of the amount of information to be transmitted within a following pre-defined time interval. For example, the transmitter node(s) can perform the estimation, at least partly, based on the amount and type of information in its/their transmitter buffer(s). Alternatively, or in addition, the estimation can be based on received user requests for information. Furthermore, it may be known in advance that some information is to be transmitted locally or regionally in the system. Also such known information is preferably used in the estimation process. In addition, some channels, typically broadcast channels, may be mandatory for a transmitter node to send. The information to be transmitted on these mandatory channels is preferably included in the estimation.

In either case, the estimated information amount reflects the actual need of the node subset for transmission of multi- and single-node-associated information and need for multi- and single-node-adapted resources, which may differ from the resource allocation defined by the default resource allocation. If there is a need, as determined based on the expected information amount, for a (temporary) different allocation, the node subset dynamically adjusts the default resource allocation based on the estimated information amount. This means that the physical resources defined by the default resource structure are dynamically shared in the frequency domain. In other words, a multi-node-adapted communication resource will (temporarily) be allocated for usage for transmission, by the subset of transmitter nodes, of single-node-associated information and/or a single-node-adapted resource will be allocated for usage for transmission of multi-node-associated information.

The subset of transmitter nodes will then transmit information according to the adjusted default resource allocation whereas the remaining transmitter nodes in the network will transmit according to the default resource allocation.

The dynamic adjustment of this default resource allocation according to the present invention, thus reflects and adapts to the actual and local transmission needs in different regions of the network. Such an adjustment can be used for coping with a temporary excess or deficient of one of the information types. This should be compared to the prior art situation where a given transmitter node will be silent during periods of multi-node-adapted resource utilization when having no multi-node-associated information to transmit even though the transmit buffer of the node contains single-node-associated information. The dynamic adjustment of the invention provides a more flexible usage of resources and increases the system throughput.

The invention offers the following advantages:
Provides a fast, efficient and flexible resource management and sharing;
Increases the system throughput by providing a more efficient utilization of the available communication resources; and
Can be used as a complement to network-wide optimizations of default resource allocations.

Other advantages offered by the present invention will be appreciated upon reading of the below description of the embodiments of the invention.

SHORT DESCRIPTION OF THE DRAWINGS

The invention together with further objects and advantages thereof, may best be understood by making reference to the following description taken together with the accompanying drawings, in which.

Figure 6A:
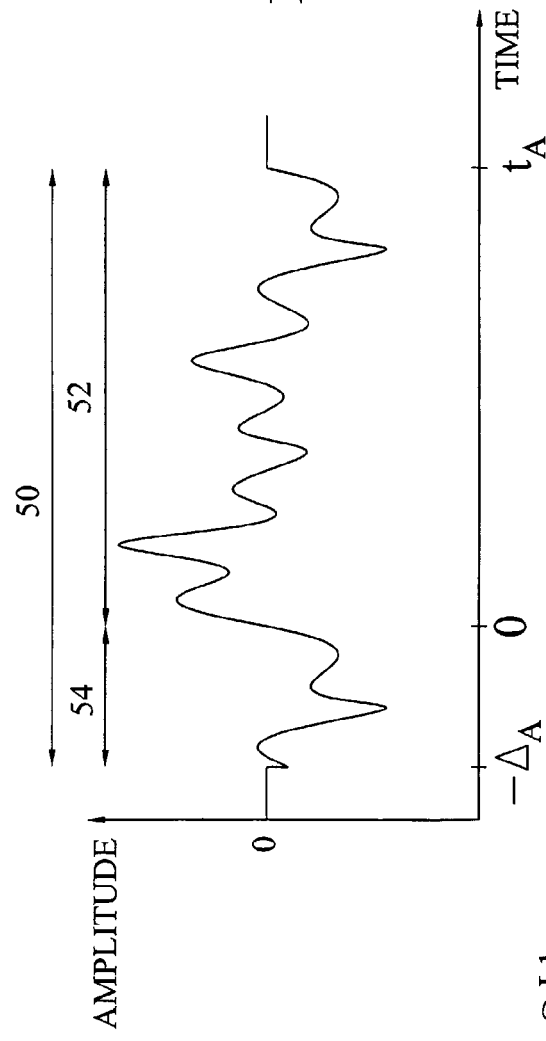
Figure 6B:
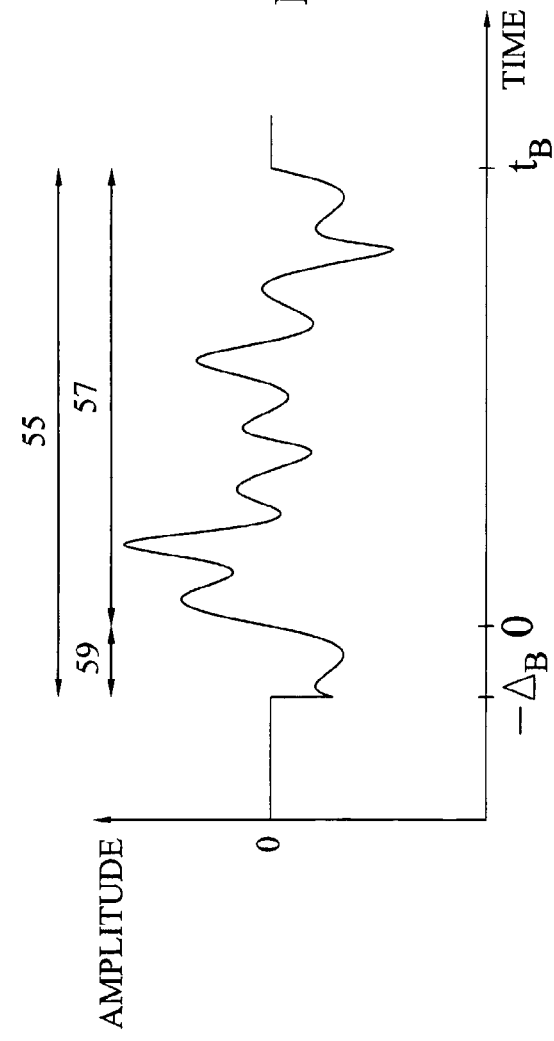
Figure 2:
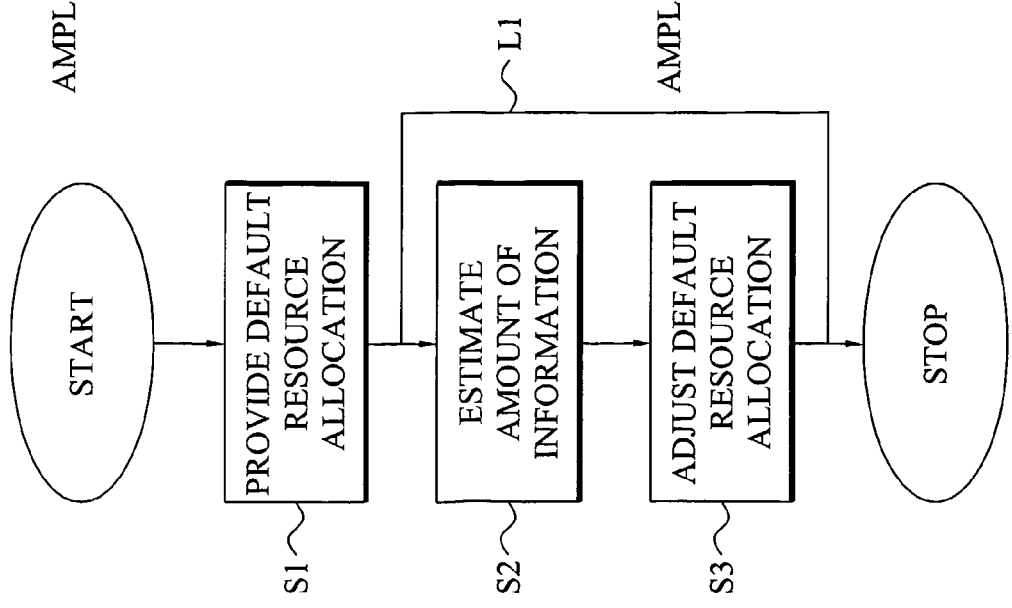
FIG. 2 is a flow diagram of a method of managing communication resources according to the present invention.
Figure 11:
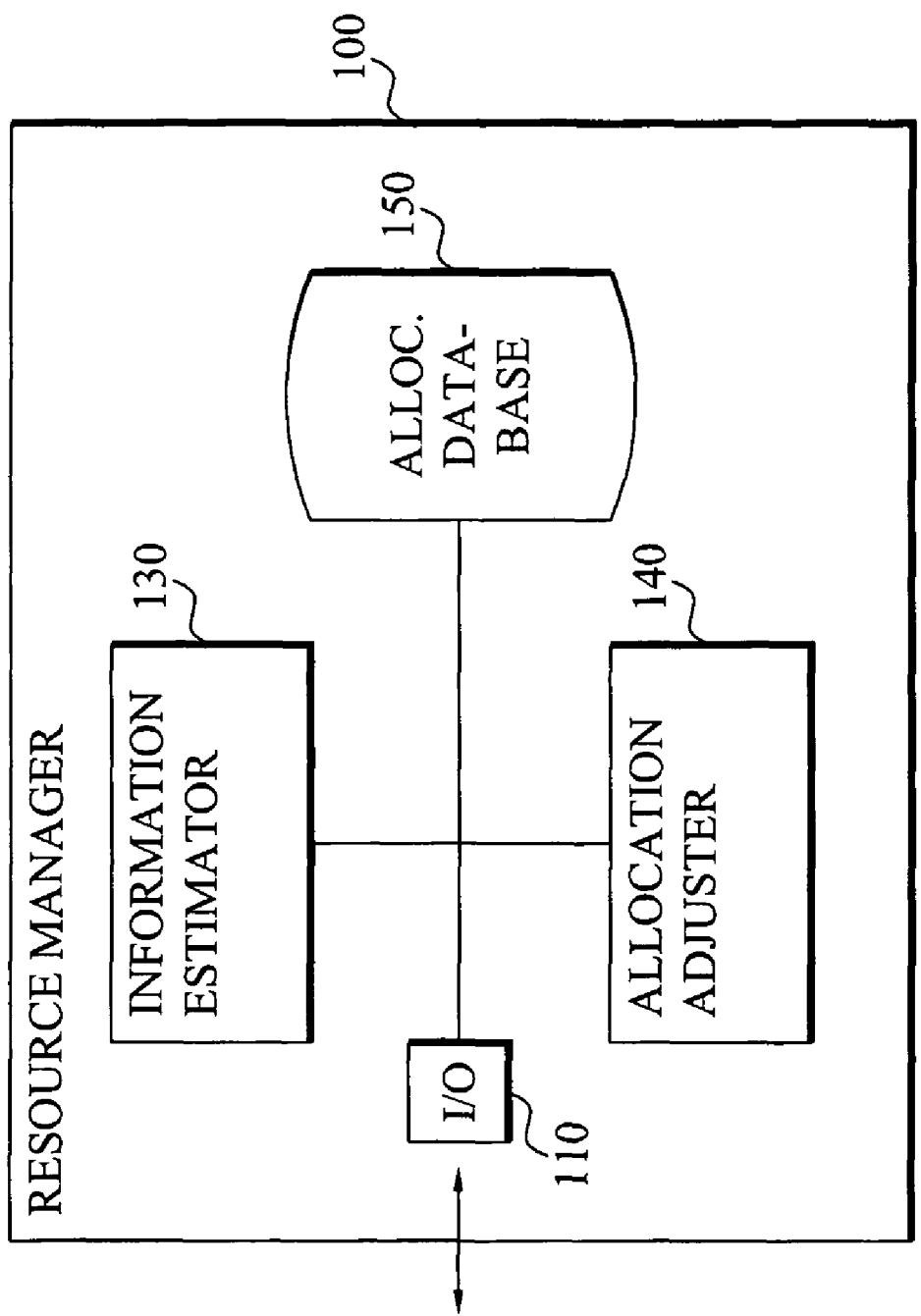
Figure 12:
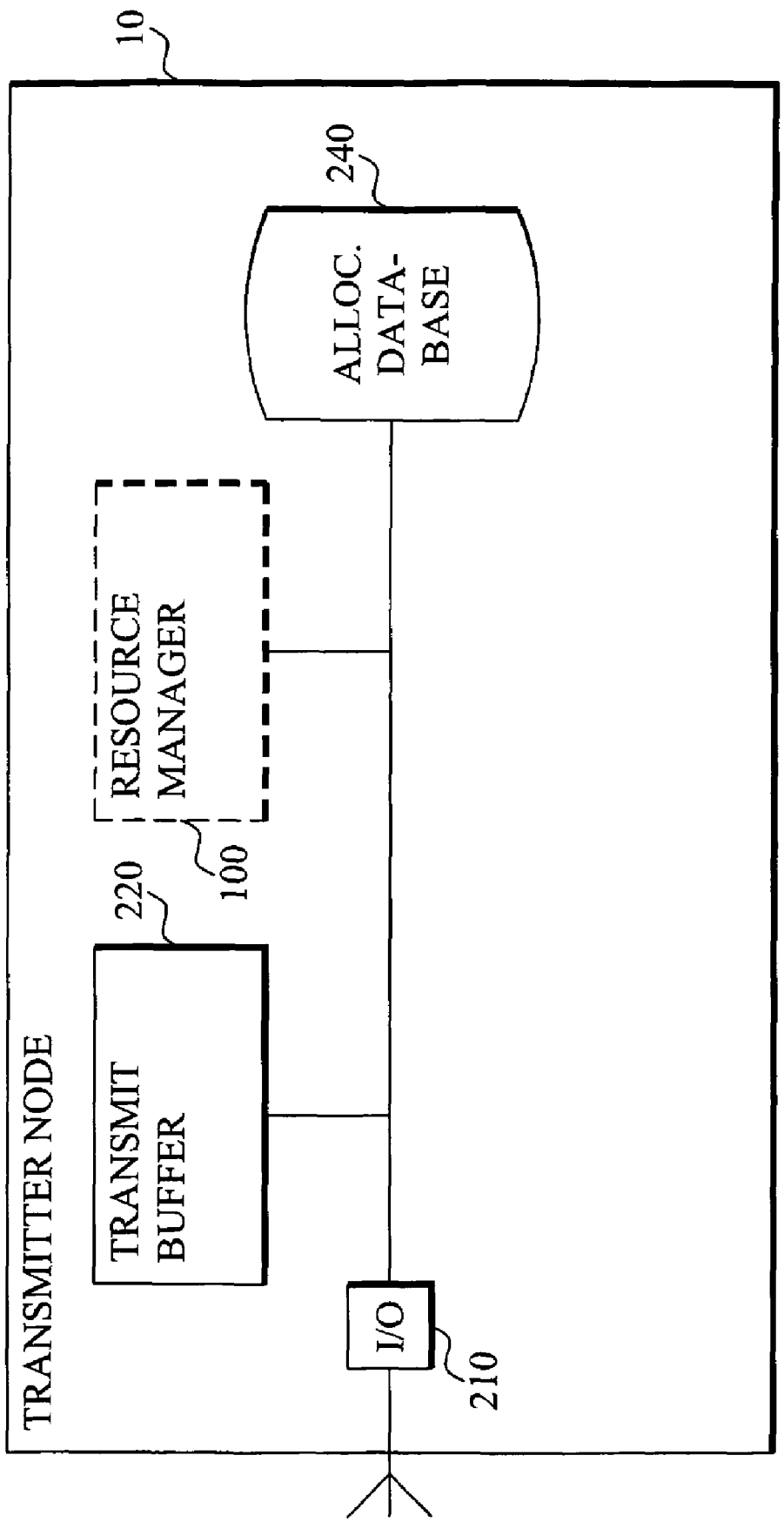

FIG. 6A schematically illustrates the principle with a symbol having an associated long cyclic prefix;

FIG. 6B schematically illustrates the principle with a symbol having an associated short cyclic prefix;

FIG. 7 is a flow diagram illustrating an additional step of the resource managing method of FIG. 2;

FIG. 8 is a flow diagram illustrating an embodiment of the adjusting step of the resource managing method of FIG. 2 in more detail;

FIG. 9 is a flow diagram illustrating an additional step of the resource managing method of FIG. 2;

FIG. 10 is a block diagram illustrating an embodiment of a resource manager according to the present invention;

FIG. 11 is a block diagram illustrating another embodiment of a resource manager according to the present invention; and FIG. 12 is block diagram illustrating an embodiment of a transmitter node according to the present invention.

DETAILED DESCRIPTION

Throughout the drawings, the same reference characters will be used for corresponding or similar elements.

The present invention relates to communication resource management in wireless radio-based communication systems and teaches local dynamic adjustment of semi-fixed scheduling schemes in such systems.

Figure 1:
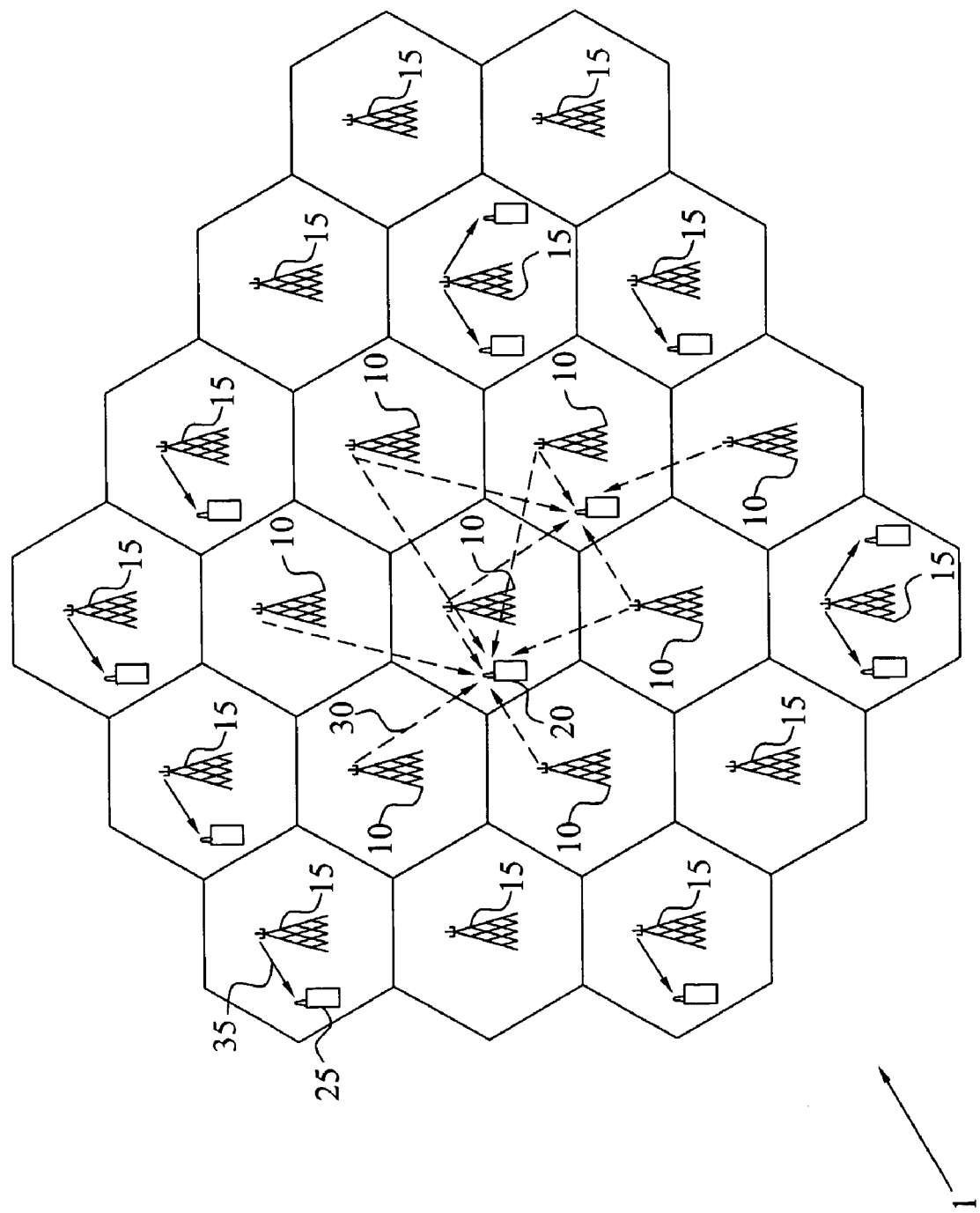
FIG. 1 is a schematic overview of a wireless communication system employing the present invention.

FIG. 1 schematically illustrates a portion of a communication system or network 1 according to the present invention. The communication system 1 comprises multiple transmitter nodes or base stations 10, 15 communicating with connected user terminal, represented as mobile terminals 20, 25 in the figure. According to the present invention, the transmitter nodes 10, 15 can communicate, to the user terminals 20, 25, at least two different types of information or data that is defined by the way the data is transmitted to the user terminals 20, 25.

The first type of information is so-called multi-node-associated information that is transmitted by at least two transmitter nodes 10 to one or more user terminals 20. In other words, these at least two transmitter nodes 10 transmits the same information in a time-coordinated manner to the user terminal(s) 20. A typical example of such multi-node-associated information, is broadcast information that is time-coordinately transmitted by multiple transmitter nodes 10 to one or more user terminals 20. For a communication system 1 employing Orthogonal frequency division multiplexing (OFDM) operating in a Single Frequency Network (SFN) broadcast mode, the SFN broadcast information that is time-coordinately transmitted by multiple transmitter nodes 10 is a particular example of the so-called multi-node-associated information according to the present invention. In this SFN mode, the transmitting nodes 10 are roughly time-synchronized and use the SFN technique for (multi-node-associated) information that shall be broadcast to several user terminals 20 located in a large area covered by multiple cells. However, multi-node-associated information as defined by the invention need not necessarily have to be communicated to multiple user terminals 20. Also user-specific information that is intended only to a specific user terminal 20 is also within the scope of multi-node-associated information provided that it is time-coordinately transmitted to this user terminal 20 by at least two transmitter nodes 10.

Time-coordinated transmission means that there is a time-relation between the transmissions of the same multi-node-associated information from the participating transmitter nodes 10 (e.g. the nodes 10 operating in SFN mode). This time-relation between the transmission occasions for the participating nodes 10 is preferably such that the transmitted signals carrying the same multi-node-associated information is reached the destined user terminal(s) 20 within such a short time-window as possible. The transmitter nodes 20 could be time-synchronized to transmit the same multi-node-associated information synchronously. However, this is merely a particular embodiment of time-coordinated transmission as defined in the present invention. There might also be a (small) time gap between the information transmissions. As long as the difference in propagation time between the multiple transmitters 10 in relation to the receiving user terminal 20 is smaller than the length of a cyclic extension employed in the transmissions, the terminal 20 can easily detect the signals and provide the carried information without any inter-symbol interference (ISI) or inter-channel interference (ICI).

As is well-known in the art, OFDM symbols transmitted from a transmitter node 10, 15 to a user terminal 20, 25 are often associated with a cyclic extension employed for combating and preventing ISI and ICI and simplifying channel equalization. The cyclic extension provides time for multi-path signals from the previous symbol to fade out before the information from the current symbol is gathered in the receiver 20, 25. As long as the multi-path delay echoes stay within the cyclic extension duration, there is strictly no limitation regarding the signal level of the echoes. The signal energy from all paths just adds at the input to the receiver 20, 25 and the whole available power feeds the decoder of the receiver 20, 25. The length of the employed cyclic extensions depends on the duration of the actual channel impulse response, which in turn typically depends on the network size and the maximum expected distance between the transmitter node 10, 15 and the receiver terminal 20, 25. In general, the longer the distance the longer cyclic extension is needed.

When operating in a multi-node-transmission mode such as SFN mode that involves time-coordinated transmission from multiple transmitter nodes 10, longer cyclic extensions are generally required compared to single-node transmission from a single transmitter node 15. FIG. 6A schematically illustrates an OFDM symbol 50 comprising a so-called "useful" part of the symbol 52 and a cyclic extension part 54. The length $t_A$ of the useful part 52 is typically equal to $1/f_c$, where $f_c$ is the frequency distance between two adjacent sub-carriers. The length $\Delta_A$ of the cyclic extension 54 is in turn determined by the criteria discussed above, i.e. channel impulse response duration and maximum transmitter-receiver distance. FIG. 6A illustrates an OFDM symbol 50 adapted for transmission of multi-node-associated (SFN-broadcast) information due to the relatively long cyclic extension 54. Such a symbol 50 can therefore be employed when transmitting data according to the SFN mode.

A cyclic extension according to the present invention can be a cyclic prefix 54 preceding the useful part 52 of the symbol as illustrated in the figure. In a typical embodiment, this cyclic prefix 54 can be regarded as a mirror in time of the end of the symbol waveform put at the start of the symbol 52. This form of cyclic prefix 54 effectively extends the length of the symbol 52, while maintaining the orthogonality of the sub-carrier waveforms in a time dispersive channel.

Other forms of cyclic extensions can be used according to the invention including, for example, cyclic postfixes. Also time domain windowing can be employed for this purpose. The cyclic repeat of the signal is then multiplied with a time window giving a roll-on part, a constant part and a roll-off part of the cyclic repeat. The roll-on part and the constant part is often inserted prior the useful part of the OFDM symbol similar to a prefix, whereas the roll-off part is often inserted after the symbol as a postfix. Furthermore, the roll-off part of the previous OFDM symbol may, but does not have to, overlap in time with the roll-on part of the current symbol. The roll-on and roll-off parts are used for forming spectra of the transmitted signal and typically only the constant part of the cyclic repeat will be used for preventing time dispersion. A further cyclic extension example according to the present invention is insertion of a silent guard period between the symbols. However, even though such a silent guard period between successive OFDM symbols would avoid ISI in a dispersive environment, it does not prevent the loss of sub-carrier orthogonality. As a consequence, a cyclic extension according to the present invention is preferably a cyclic prefix, cyclic postfix, cyclic time domain window or some other cyclic extension than can be used for combating both ISI and ICI.

Returning to FIG. 1, the first information type or multi-node-associated information type is thus time-coordinately transmitted by multiple transmitter nodes 10 using symbols having long associated cyclic extensions. The second type of information according to the present invention is single-node-associated or node/cell-specific information that is transmitted (unicast or multicast) by single transmitter nodes 15 to typically one, but possibly multiple, user terminal(s) 25. When transmitting the single-node-associated information, the transmitter nodes 15 typically operate in a normal cellular operation mode in contrast to e.g. SFN mode for multi-node-associated information. The single-node-associated information typically requires shorter cyclic extensions for the symbols as compared to multi-node-associated information. FIG. 6B illustrates an OFDM symbol 55 having a useful part 57 adapted for carrying single-node-associated information and a short cyclic extension 59. Thus, the length $\Delta_B$ of the short cyclic extension 59 in FIG. 6B is shorter than the length $\Delta_A$ of the long cyclic extension 54 of FIG. 6A.

Figure 3:
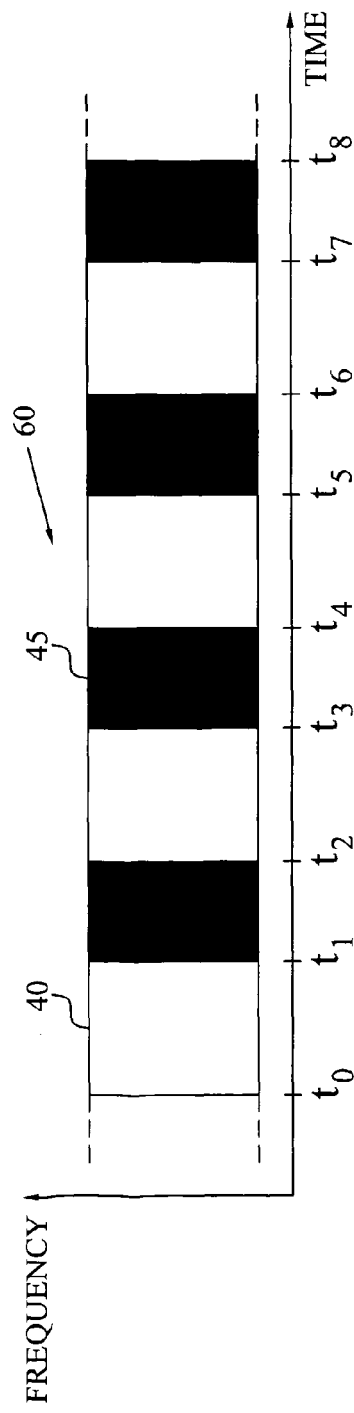
FIG. 3 illustrates a default resource allocation specifying different communication resource types.

In an OFDM-based communication system 1, a single time division multiplexing of OFDM symbols with long and short cyclic extensions is generated for all transmitter nodes 10, 15 in the network 1. This network 1 can e.g. include all transmitter nodes 10, 15 in a particular country, a region of a country or some other defined area. This so-called semi-fixed default resource allocation of time division multiplexed communication resources then stipulates when the transmitter nodes 10, 15 can transmit multi-node-associated information using multi-node-adapted communication resources (having long cyclic extension) and transmit single-node-associated information by means of single-node-adapted communication resources (having short cyclic extension). FIG. 3 schematically illustrates an example of such a semi-fixed default resource allocation 60. According to this example resource allocation 60, the transmitter nodes can alternately use multi-node-adapted resources 40 and single-node adapted resources 45. Thus, within the time intervals $t_1-t_0$, $t_3-t_2$, $t_5-t_4$, $t_7-t_6$ multi-node-adapted resources (orthogonal sub-carriers with symbols having long cyclic extensions) 40 are available for the transmitter nodes in order to transmit multi-node-associated information (SFN broadcast information). Correspondingly, within the time intervals $t_2-t_1$, $t_4-t_3$, $t_6-t_5$, $t_8-t_7$, the available single-node resources (orthogonal sub-carriers with symbols having short cyclic extensions) 45 can be used by the transmitter nodes in the network for transmitting so-called single-node-associated information (multicast or unicast information transmitted by single transmitter node(s)).

This default resource allocation 60 stipulates that during the time period $t_2-t_1$ all transmitter nodes in the network will transmit single-node information, provided that they have any such information to transmit. Thus, according to prior art techniques in this period $t_2-t_1$ no multi-node-information will be transmitted since the communication resources 45 available during the period will not be adapted for transmitting such kind of information, i.e. have too short cyclic extensions. Correspondingly, according to prior art techniques, in the time period $t_1-t_0$ the transmitter nodes having multi-node-associated information in their transmitter node will transmit the information using the available multi-node-adapted resources 40. Transmitter nodes of the network having no such multi-node-associated information to transmit in the time period $t_1-t_0$ will be silent even though they may have single-node-associated information to transmit.

The exact design of the default resource allocation or schedule scheme 60 and the division between multi-/single-node-adapted communication resources 40, 45 are typically based on the average (expected) traffic pattern throughout the whole network. This means that if there is expected to be relatively much single-node-associated information to be transmitted on average over the whole network, the time periods dedicated for transmission of such information are typically extended at the cost of time-periods for transmitting multi-node-associated information.

At a given period time one or some, i.e. a subset, of the transmitter nodes might though have e.g. more multi-node-associated information to transmit than what actually can be transmitted based on the default resource allocation 60. If this problem often occurs in large portions of the network on a longer time scale, it may be necessary to optimize or re-define the default resource allocation 60, i.e. change the mix of physical resources 40, 45 for multi- and single-associated information. This is however a relatively complicated procedure that requires that the whole network, i.e. all including transmitter nodes, changes this mix at the same time.

The present invention solves this problem by allowing the transmitter nodes to dynamically adjust the semi-fixed resource allocation 60 to cope with their current actual transmission need, i.e. in response to whether they have an excess or deficit of multi-node-associated information (or single-node-associated information) to send.

FIG. 1 illustrates a communication system 1 during e.g. the time period $t_2-t_1$ and the transmitter nodes 10, 15 should, thus, according to the resource allocation of FIG. 3, all perform single-node transmissions or be silent. This is done by most of the nodes 15 in the network 1, of which some have single-node-associated information to transmit to user terminals 15 and some have no information to send. However, a portion or subset of the transmitter nodes 10 in the network 1 has larger need for transmitting multi-node-associated information. These nodes 10 then adjust the default resource allocation so that current available single-node-adapted communication resources are used for multi-node transmissions.

This solution according to the present invention provides a much faster, and more flexible and efficient utilization of communication resources and transmission of information than prior art techniques. Furthermore, the throughput in the system 1 will improve.

FIG. 2 is a flow diagram illustrating a method of managing communication resources in a wireless communication system according to the present invention. A step S1 provides or defines a default resource allocation specifying when the transmitter nodes in the system can use multi-node-adapted and single-node-adapted resources, respectively, for transmission of information. This default resource allocation is typically a mix of the at least two resource types as in FIG. 3. However, the allocation scheme can alternatively specify the usage of only one of the resource types or include a more complex allocation structure of resource utilization. This single default resource allocation is generated for all transmitter nodes in the system, generally by a base station controller (BSC) node, radio network controller (RNC) node or some other higher level control node.

In a next step S2, one or a portion of the transmitter nodes estimate the expected amount of multi-node-associated information and/or single-node-associated information to be transmitted by that particular transmitter node or those particular nodes. The expected amount of information could be based on an estimation of the amount of information to be transmitted within a following pre-defined time interval. For example, the transmitter node(s) can perform the estimation, at least partly, based on the amount and type of information in its/their transmitter buffer(s). Alternatively, or in addition, the estimation can be based on received user requests for information. Furthermore, it may be known in advance that some information is to be transmitted locally or regionally in the system. Also such known information is preferably used in the estimation process. In addition, some channels, typically broadcast channels, may be mandatory for a transmitter node to send. The information to be transmitted on these mandatory channels is preferably included in the estimation.

The expected amount of information could state the number of bits to be transmitted using multi-node-adapted and single-node-adapted resources, respectively. Alternatively, the number of data packets or blocks that is expected to be transmitted for the different information types can be used as representation of the information amount. Actually, any parameter that can be used for representing this expected amount of information, e.g. including expected number of required communication resources, OFDM symbols or sub-carriers, can be used according to the invention.

In an embodiment of the present invention, the estimation of step S2 is based on the expected amount of multi-node-associated information, e.g. based on the expected amount of SFN-related information such as broadcasting of digital video and/or digital audio. For example, the system decides, for each SFN broadcast service, which transmitter nodes that should be transmitting (multi-node-associated) information related to the corresponding broadcast service in SFN mode. If any user terminal has requested transmission of a broadcast channel from a particular transmitter node, that node is added to the SFN-list of transmitter nodes that are cooperatively transmitting the corresponding broadcast service. The expected amount of multi-node-associated information can then be estimated for those nodes, or a portion thereof, that are found in the SFN-list, and where the estimation is made, at least partly, based on the number of user requests.

In another embodiment, only single-node-associated information is relevant for the information estimation process. For example assume that the multi-node-associated information includes data related to a broadcasted digital video service and at least two different SFN broadcast modes are available for this service. In the first high quality-mode, all the bits related to the digital video service is broadcast to the relevant user terminal(s). This typically results in a very high quality of service. In the second mode, only a portion of the bits will be transmitted, e.g. three quarters of the bits. This results in slightly poorer, but still acceptable, quality of service. If there is little single-node-associated information to be transmitted in the subset of nodes, as estimated in step S2, the first transmission mode will be employed for multi-node transmission otherwise the second transmission mode will be used.

In a further embodiment both the expected amount of single-node-associated and multi-node-associated information to be transmitted by the subset of transmitter node is estimated in step S2.

In the following step S3, the default resource allocation is dynamically adjusted or adapted for this subset of transmitter nodes based on the estimated amount of information. This means that the physical resources defined by the default time structure are dynamically shared in the frequency domain. In other words, a multi-node-adapted communication resource will (temporarily) be allocated for usage for transmission, by the subset of transmitter nodes, of single-node-associated information and/or a single-node-adapted resource will be allocated for usage for transmission of multi-node-associated information.

Figure 4:
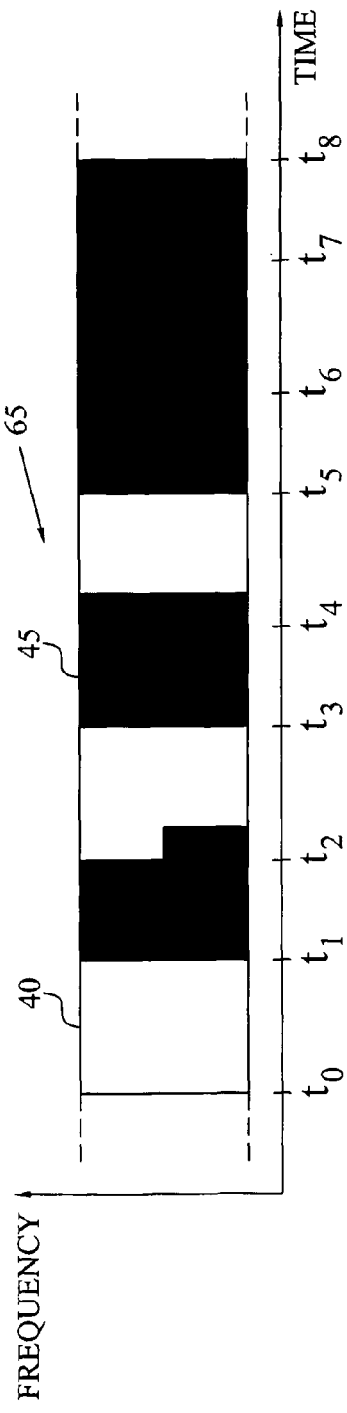
FIG. 4 illustrates a dynamically adjusted default resource allocation according to an embodiment of the present invention.

FIG. 4 illustrates such an adjusted resource allocation 65 for the case where the amount of multi-node-associated data in a portion of the system does not fill up the allocated physical resources 40 for this type of information (i.e. the OFDM symbols with long cyclic extension are partly unused). In such a case, single-node-associated information may be frequency multiplexed together with the multi-node (broadcast) channel and transmitted in these multi-node-adapted resources 40. For example, in an OFDM system operable in SFN mode, this means that only the sub-carriers 40 that are carrying broadcast channels are transmitted in SFN mode while the sub-carriers 40 carrying single-node-associated information are only transmitted from the specific corresponding transmitter node(s). Thus, the OFDM symbols transmitted in SFN mode from different nodes are different. Only the symbols transmitted on the sub-carriers carrying broadcast information are the same in all nodes that are cooperating in the SFN mode. The benefit with this is that the symbols defined for SFN-mode can be used also when there is only little broadcast information to transmit. Even though the "free" broadcast-adapted resources 40 (symbols with long cyclic extension) will be used for single-node-associated information that typically does not require such long cyclic extension this slight overhead results in higher system throughput since it will be better to send information, if available, with a bit too large overhead than not to utilize the free communication resources.

Note that single-node-associated information can be frequency multiplexed together with the multi-node-associated information during those time intervals that otherwise are adapted for multi-node transmissions, as is illustrated by the time interval $t_3$-$t_2$. Alternatively, depending on the amount of multi-node-associated information to be transmitted in the respective interval, the single-node-associated information can partly or completely replace the multi-node-associated information, as is illustrated by the time intervals $t_5$-$t_4$ and $t_7$-$t_6$.

Figure 5:
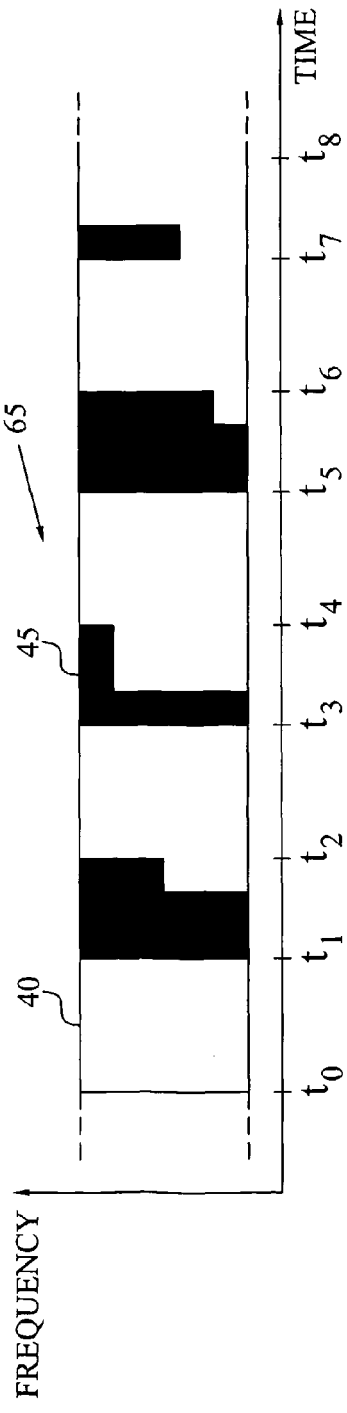
FIG. 5 illustrates a dynamically adjusted default resource allocation according to another embodiment of the present invention.

FIG. 5 correspondingly illustrates an adjusted default resource allocation 65 for the case where the amount of multi-node-associated information exceeds the allocated physical resources 40 for multi-node transmission, i.e. there are not enough OFDM symbols with long cyclic extension. In this situation, the multi-node (broadcast) channels may use some additional sub-carriers 45 with OFDM symbols with short cyclic extension, i.e. some of the single-node-adapted resources 45. Since the short cyclic extension of these symbols is not designed for multi-node (SFN) operation, the probability for ISI and ICI on these symbols increases. However, by interleaving and encoding the multi-node channels over all involved OFDM symbols (with both long and short cyclic extension), the degradation caused by this can be minimized. The multi-node channels are first mapped to the physical resources 40 reserved for multi-node transmission (i.e. OFDM symbols with long cyclic extension) before physical resources 45 reserved for single-node data (i.e. OFDM symbols with short cyclic extension) are used for the multi-node-associated data.

If the system includes N transmitter nodes for which the default resource allocation apply, the subset of transmitter nodes that perform the estimation of step S2 and adjustment of step S3 is 1 to N−1 of these transmitter nodes. For example, if the default resource allocation applies to all transmitter nodes in a given country, the subset of transmitter node can be the nodes present in a state of the country, a city or some other region of the total network.

The steps S2 and S3 are preferably repeated for the transmitter nodes throughout operation, which is schematically illustrated by the line L1. For example, the estimation of step S2 can be performed continuously, periodically, intermittently or at pre-defined time occasions in all nodes in the system or a portion thereof. If the expected amount of information (single- and/or multi-node-associated information) estimated change, e.g. exceeds or falls below given threshold values, a new adjustment of the default resource allocation is performed in step S3.

Note that over time most of the transmitter nodes typically operate and transmit according to the default resource allocation, i.e. only uses multi-node-adapted resources (orthogonal sub-carriers carrying OFDM symbols having long cyclic extension) for multi-node-associated information (SFN broadcast information) and single-node-adapted resources (orthogonal sub-carriers carrying OFDM symbols having short cyclic extension) for single-node-associated information (unicast/multicast information). This means that the dynamic adjustment of this default resource allocation according to the invention is typically employed locally and temporarily in parts of the network in order to adapt to the local and current transmission demands. If many of the transmitter node often employ an adjusted default resource allocation, this is typically an indication of a need for a re-definition or optimization of the default resource allocation on an overall network-basis. However, such an optimization includes all transmitter nodes in the network and operates on a longer time scale (hours or days), whereas the present invention performs a dynamic and temporary adjustment of the default resource allocation locally for only a part of the network and on a much shorter time scale (minutes, seconds or part of seconds).

In a preferred embodiment of the invention, a multi-node-adapted resource is, as has been described in the foregoing, an orthogonal sub-carrier carrying a (OFDM) symbol 50 having an associated long cyclic extension 54 as illustrated in FIG. 6A. Correspondingly, a single-node-adapted resource is preferably an orthogonal sub-carrier carrying a symbol 55 having an associated short cyclic extension 59 as illustrated in FIG. 6B. The total length $t_A+\Delta_A$, $t_B+\Delta_B$ of a symbol 50, 55 consists of the cyclic extension 54, 59 length $\Delta_A$, $\Delta_B$ and the length $t_A$, $t_B$ of the useful symbol part 52, 57. If the sub-carrier distance is the same for both types of symbols 50, 55, the length of the useful symbol part 52, 57 will be the same, i.e. $t_A=t_B$. This in turn implies that the total symbol lengths $t_A+\Delta_A$, $t_B+\Delta_B$ will differ since $\Delta_A>\Delta_B$. If, however, the sub-carrier distance for the two types of symbols 50, 55 is different, the length of the useful symbol parts 52, 57 differs, i.e. $t_A \neq t_B$. The total symbol length $t_A+\Delta_A$, $t_B+\Delta_B$ for the two symbol types 50, 55 may then be equal or differ depending on the actual length of the cyclic extensions 54, 59.

The OFDM symbols 50, 55 may be organized into frames with pre-defined size. Such a frame could then include $N_A$ symbols 50 with long extensions 54 or $N_B$ symbols 55 with short extensions 59. By careful choice of the parameters $t_A$, $t_B$, $\Delta_A$, $\Delta_B$, $N_A$, $N_B$, the frame time or length can be the same for both symbol types 50, 55. Usage of a same frame time independent of the actual type of information furthermore facilitates synchronization of the system.

FIG. 7 is a flow diagram illustrating an additional procedure step of the resource management method of FIG. 2. The method continues from step S1 in FIG. 7. In a next step S10, the subset of transmitter nodes receives user requests for multi- and/or single-node-associated services and information from user terminals connected to the nodes. The method then continues to step S2 of FIG. 2, where the transmitter nodes estimates the expected amount of information to be transmitted based on these user requests. The estimation can then simple be based on how many requests there are for the respective information type. A more elaborated solution is to investigate the particular requests more closely. For example, a first broadcast service generally involves transmission of more broadcast information than a corresponding second broadcast service. A user request for the first broadcast service may then be weighted differently than a corresponding request for the second service, since the former implies more information transmissions.

FIG. 8 is a flow diagram illustrating an embodiment of the adjusting step in FIG. 2 in more detail. The method continues from step S2 in FIG. 2. In a next step S20, the subset of transmitter nodes frequency multiplex multi- and single-node associated information based on the estimated expected amount of information in order to obtain an adjusted default resource allocation. This frequency multiplexing will result in that multi-node-associated information will be transmitted using single-node-adapted resources and/or single-node-associated information will be transmitted on multi-node-adapted resources. The method then ends or returns to step S2 of FIG. 2, where a new estimation is anew conducted.

FIG. 9 is a flow diagram illustrating an additional procedure step of the resource managing method of FIG. 2, which together with steps S1 to S3 of FIG. 2 defines a transmission method. The method continues from step S3 in FIG. 2. In a next step S30, the subset of transmitting nodes transmits information according to the dynamically adjusted default resource allocation, whereas the remaining nodes in the system transmit according to the default resource allocation as unadjusted. This information transmission of the invention, even though not optimal from overhead or ISI/ICI point of view, will lead to increased throughput in the system. Note that in this transmission all transmitting nodes will employ the same type of resources, but the nodes transmitting according to adjusted default resource allocation will, at least for some resources, transmit different type of information compared to the nodes transmitting according to the default resource allocation. The method then ends or returns to step S2 of FIG. 2, where a new estimation is anew conducted.

FIG. 10 is a schematic block diagram of an embodiment of a resource manager 100 according to the present invention. The manager 100 optionally includes an input and output (I/O) unit 110 for communicating with external units in the system. This I/O unit 110 is in particular adapted for receiving data used for estimating expected amount of information to be transmitted from other nodes in the system (indications of mandatory and/or local future transmissions) and/or user terminals (user requests for communication services). The I/O unit 110 can further be used for transmitting information of default and adjusted default resource allocations to use for transmitter nodes.

The resource manager 100 comprises a resource allocation scheme definer or resource allocator 120 for providing or defining the default resource allocation specifying when to use multi- and single-node-adapted resources for the transmitter nodes in the system to transmit information. The information or an indication of the defined default resource allocation is typically forwarded to and stored in an allocation database 150 or some other memory unit in the manager 100.

The allocation generation is typically based on past traffic information collected from the transmitter nodes in the system. The definer 120 then uses this traffic information to generate a (optimal) scheduling scheme of resource types that reflects, as accurately as possible, the actual resource needs as averaged throughout the system. The definer 120 typically operates on a relatively long time scale, implying that a new default resource allocation for the nodes is generated on the basis of several days or at least hours. An indication of the need for a new allocation generation can be based on how often and how many of the network nodes in the system employ the allocation adjustment of the present invention.

An information estimator 130 is also implemented in the resource manager 100 and operated or configured for estimating the amount of information to be transmitted by the transmitter node(s). Thus, this estimator provides an indication of the expected future need for opportunities to transmit single- and multi-node-associated information, respectively. As has been discussed in the foregoing, this estimation can be based on the expected amount of single- and/or multi-node-associated information. The estimation could be based on reports of the filling-level of the transmitter buffers, user requests for communication services, information of mandatory and/or local transmissions.

A resource allocation adjuster or resource re-allocator 140 of the resource manager 100 uses the estimated amount of information from the estimator 130 to determine whether an adjustment of the default resource allocation should be performed for a particular transmitter node or a group of nodes. If this is the case, the adjuster 140 dynamically adjusts the default resource allocation from the definer 120 or as fetched from the allocation database 150 based on the estimated information amount. In this adjustment, the adjuster 140 gives the transmitter node(s) more opportunity to transmit a first type of information at the cost of a second information type by temporarily allocating resources adapted for the second information type for transmission of the first type information. The so-obtained adjusted resource allocation is then communicated to the relevant transmitter node(s) by the I/O unit 110, unless the manager 100 is implemented therein. Information of the adjusted resource allocation is preferably also stored in the allocation database 150 for later use, e.g. when collecting information that will be used as basis for a possible new default resource allocation re-definition.

The units 110 to 140 of the resource manager 100 may be provided as software, hardware or a combination thereof. The units 110 to 150 may be implemented together in a network node in the communication. The relevant network node can be a transmitter node or base stations. Alternatively, the manager 100 could be provided in a higher-level control such as BSC or RNC node. Furthermore, a distributed implementation is also possible with some of the units provided in different network nodes.

FIG. 11 is a schematic block diagram of another embodiment of the resource manager 100 according to the present invention. The operation of the information estimator 130, resource allocation adjuster 140 and allocation database 150 is similar to the corresponding units in FIG. 10 and is not repeated herein. This resource manager 100 does not have its own resource allocation definer. Instead the I/O unit 110 functions as a resource allocation provider by receiving information of the default resource allocation to use from some other network node in the system. This network node could be a high-level control node that performs the resource allocation generation for the whole communication system and then communication information of the resource allocation to lower-level control nodes and/or transmitter nodes. The resource allocation adjuster 140 then adjusts this default resource allocation from the I/O unit 110 or from the database 150, if first entered therein, based on the estimations from the estimator 130.

The units 110, 130 and 140 of the resource manager 100 may be provided as software, hardware or a combination thereof. The units 110, 130 to 150 may be implemented together in a network node in the communication. The relevant network node can be a transmitter node or base station. Alternatively, the manager 100 could be provided in a higher-level control such as BSC or RNC node. Furthermore, a distributed implementation is also possible with some of the units provided in different network nodes.

FIG. 12 is a schematic block diagram illustrating an embodiment of transmitter node 10 according to an embodiment of the present invention. This node 10 includes an I/O unit 210 for communicating with external nodes and units, including user terminals. Thus, the I/O unit 210 includes modulator/demodulator, coder/decoder, and other functionalities required for data transmission and reception. A transmitter buffer 220 is implemented in the node 10 for, temporarily, storing multi-node-associated and single-node-associated information and data to be transmitted to user terminals. The transmission of these data types is scheduled based on the default resource allocation or an adjusted default resource allocation, information of which is preferably contained in an allocation database 240 in or associated with the transmitter node 10. The default resource allocation to use for transmitting data is preferably received by the I/O unit 210 from an external network node comprising a resource manager according to the present invention, e.g. from a BSC node. Also the adjusted versions of this default resource allocation can be received by the I/O unit 210 from external nodes and entered in the allocation database 240.

In an alternative embodiment, the transmitter node 10 includes its own resource manager 100. In such a case, the default resource allocation may be received from external nodes as described above. The resource manager 100 then adjusts this resource allocation based on the actual transmission needs of the particular transmitter node 10, i.e. of an expected amount multi- and/or single-node-associated information to be transmitted by the node 10. This expected amount of information can be estimated on the filling degree of the buffer 220 and what type of information that is contained therein. The so-adjusted resource allocation is then preferably entered in the allocation database 240 and/or forwarded to the I/O unit 210 for use when transmitting data.

The units 100, 210 and 220 of the transmitter node 10 may be provided as software, hardware or a combination thereof.

It will be understood by a person skilled in the art that various modifications and changes may be made to the present invention without departure from the scope thereof, which is defined by the appended claims.

REFERENCES

[1] Peled and Ruiz, Frequency domain data transmission using reduced computational complexity algorithms, *Proc. IEEE ICASSP*, pp. 964-967, Denver, Colo., 1980
[2] Henkel et al., The cyclic prefix of OFDM/DMT—an analysis, *Proc. Int. Zurich Seminar on Broadband Communications*, pp. 22-1-22-2, Zurich, Switzerland, 2002.

The invention claimed is:

1. A method of managing communication resources in a wireless communication system comprising multiple transmitter nodes said method comprises the steps of:
    providing a default resource allocation specifying when to use multi-node-adapted and single-node-adapted communication resources for said multiple transmitter nodes to transmit information, where a multi-node-adapted communication resource is adapted for time-coordinated transmissions of multi-node-associated information and a single-node-adapted communication resources is adapted for transmission of single-node-associated information;
    estimating an expected amount of at least one of said multi-node-associated information and said single-node-associated information to be transmitted by a subset of said multiple transmitter nodes; and
    dynamically adjusting said default resource allocation, for said subset of said multiple transmitter nodes, by allocating, based on said estimated expected amount of information, a multi-node-adapted communication resource for transmission of single-node-associated information or a single-node-adapted communication resource for time-coordinated transmissions of multi-node-associated information.

2. The method according to claim 1, wherein a multi-node-adapted communication resource is adapted for time-coordinated transmissions of multi-node-associated information by at least two transmitter nodes and a single-node-adapted communication resource is adapted for transmission of single-node-associated information by a single transmitter node.

3. The method according to claim 1, wherein a multi-node-adapted communication resource is adapted for time-synchronized transmissions of multi-node-associated information by at least two transmitter nodes.

4. The method according to claim 1, wherein said dynamically adjusting step comprises the step of dynamically adjusting said default resource allocation by frequency multiplexing multi-node-associated and single-node-associated information based on said estimated expected amount of information.

5. The method according to claim 1, wherein said estimating step comprises estimating an expected amount of said multi-node-associated information to be transmitted by said subset of said multiple transmitter nodes.

6. The method according to claim 1, wherein said estimating step comprises estimating said expected amount of information based on user requests for multi-node-associated information originating from user terminals associated with said subset of said multiple transmitter nodes.

7. The method according to claim 1, wherein a multi-node-adapted communication resource is an orthogonal sub-carrier carrying a symbol having an associated cyclic extension of a first length ($\Delta_A$) and a single-node-adapted communication resource is an orthogonal sub-carrier carrying a symbol having an associated cyclic extension of a second length ($\Delta_B$), where said second length ($\Delta_B$) being shorter than said first length ($\Delta_A$).

8. The method according to claim 7, wherein said cyclic extension is at least one of:
a cyclic prefix;
a cyclic postfix; and
a cyclic time domain window.

9. The method according claim 1, wherein said multi-node-associated information is single frequency network broadcast information.

10. The method according to claim 1, wherein said communication resources are orthogonal sub-carriers and said wireless communication system is a communication system employing orthogonal frequency-division multiplexing.

11. A method of transmitting information by a transmitting node in a wireless communication system comprising multiple transmitting nodes, said communication system employing a default resource allocation specifying when to use multi-node-adapted and single-node-adapted communication resources for said multiple transmitter nodes to transmit information, where a multi-node-adapted communication resource is adapted for time-coordinated transmissions of multi-node-associated information and a single-node-adapted communication resources is adapted for transmission of single-node-associated information, said method comprising the steps of:
estimating an expected amount of at least one of said multi-node-associated information and said single-node-associated information to be transmitted by said transmitter node;
dynamically adjusting said default resource allocation, for said transmitter node, by allocating, based on said estimated expected amount of information, a multi-node-adapted communication resource for transmission of single-node-associated information or a single-node-adapted communication resource for time-coordinated transmissions of multi-node-associated information; and
transmitting information according to said adjusted default resource allocation.

12. A system for managing communication resources in a wireless communication system comprising multiple transmitter nodes, said system comprises:
means for providing a default resource allocation specifying when to use multi-node-adapted and single-node-adapted communication resources for said multiple transmitter nodes to transmit information, where a multi-node-adapted communication resource is adapted for time-coordinated transmissions of multi-node-associated information and a single-node-adapted communication resources is adapted for transmission of single-node-associated information;
an estimator for estimating an expected amount of at least one of said multi-node-associated information and said single-node-associated information to be transmitted by a subset of said multiple transmitter nodes; and
means for dynamically adjusting said default resource allocation, for said subset of said multiple transmitter nodes, by allocating, based on said estimated expected amount of information, a multi-node-adapted communication resource for transmission of single-node-associated information or a single-node-adapted communication resource for time-coordinated transmissions of multi-node-associated information.

13. The system according to claim 12 wherein a multi-node-adapted communication resource is adapted for time-synchronized transmissions of multi-node-associated information by at least two transmitter nodes.

14. The system according to claim 12, wherein said means for dynamically adjusting is configured for dynamically adjusting said default resource allocation by frequency multiplexing multi-node-associated and single-node-associated information based on said estimated expected amount of information.

15. The system according to claim 12, wherein said estimator is configured for estimating an expected amount of said multi-node-associated information to be transmitted by said subset of said multiple transmitter nodes.

16. The system according to claim 12, wherein said estimator is configured for estimating said expected amount of information based on user requests for multi-node-associated information originating from user terminals associated with said subset of said multiple transmitter nodes.

17. The system according to claim 12, wherein a multi-node-adapted communication resource is an orthogonal sub-carrier carrying a symbol having an associated cyclic extension of a first length ($\Delta_A$) and a single-node-adapted communication resource is an orthogonal sub-carrier carrying a symbol having an associated cyclic extension of a second length ($\Delta_B$), where said second length ($\Delta_B$) being shorter than said first length ($\Delta_A$).

18. The system according to claim 17, wherein said cyclic extension is at least one of:
a cyclic prefix;
a cyclic postfix; and
a cyclic time domain window.

19. The system according to claim 12, wherein said multi-node-associated information is single frequency network broadcast information.

20. The system according to claim 12, wherein said communication resources are orthogonal sub-carriers and said wireless communication system is a communication system employing orthogonal frequency-division multiplexing.

21. The network node comprising a system according to claim 12.

22. The transmitter node comprising:
means for receiving information of an adjusted resource allocation generated by a system according to claim 12; and
a transmitter for transmitting information according said information of said adjusted resource allocation.

* * * * *

UNITED STATES PATENT AND TRADEMARK OFFICE
CERTIFICATE OF CORRECTION

| | | |
|---|---|---|
| PATENT NO. | : 7,885,295 B2 | |
| APPLICATION NO. | : 11/917510 | |
| DATED | : February 8, 2011 | |
| INVENTOR(S) | : Frenger | |

It is certified that error appears in the above-identified patent and that said Letters Patent is hereby corrected as shown below:

On the Title Page, in Item (75), under "Inventor", in Column 1, Line 1, delete "Pal" and insert -- Pål --, therefor.

On the Title Page, in Item (56), under "OTHER PUBLICATIONS", in Column 2, Line 3, delete "964-957," and insert -- 964-967 --, therefor.

In Column 16, Line 63, in Claim 22, delete "according" and insert -- according to --, therefor.

Signed and Sealed this
Twenty-fourth Day of May, 2011

David J. Kappos
*Director of the United States Patent and Trademark Office*